Patented May 12, 1942

2,282,922

UNITED STATES PATENT OFFICE 2,282,922

CONVERSION OF HYDROCARBONS

Jacob Elston Ahlberg and Charles L. Thomas, Chicago, Ill., assignors to Universal Oil Products Company, Chicago, Ill., a corporation of Delaware No Drawing. Application March 20, 1937, Serial No. 132,092. Renewed June 26, 1939

3 Claims. (Cl. 196—52)

This invention relates particularly to the conversion of hydrocarbon fractions produced in distilling petroleum oils and especially those of a distillate character which are vaporizable without substantial decomposition.

In a more specific sense the invention is concerned with a modification of hydrocarbon oil conversion processes involving the use of particular and specific types of catalysts which function to selectively promote the formation of low boiling gasoline fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, there is much more to be learned about them. A large number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst.

The present invention invention is concerned with the use of catalytic materials which are specially adapted to accelerate the cracking of heavy fractions of petroleum and other hydrocarbonaceous materials to increase the rate of production of gasoline-boiling range fractions. The preferred catalysts are characterized by selectivity in accelerating gasoline-forming reactions rather than the gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises subjecting hydrocarbon oil vapors at elevated temperatures and substantially atmospheric pressure to contact with granular catalysts comprising hydrated alumina-silica masses formed by the co-precipitation in an aqueous menstruum of hydrated aluminum oxide and hydrated silicon dioxide followed by washing to remove soluble compounds and heating to remove a portion of the combined water for the conversion of said vapors into substantial yields of lower boiling hydrocarbons.

We have found that effective cracking catalysts both from the standpoint of activity and of selectivity in producing high antiknock value gasoline rather than gas from petroleum hydrocarbon fractions are produced by precipitating hydrated alumina and hydrated silica simultaneously from aqueous solutions. As a rule the best catalysts are produced when approximately molecular equivalents are precipitated which yield after washing and drying under suitable conditions mixtures corresponding to the approximate formula $Al_2O_3.SiO_2.nH_2O$, the amount of combined water varying with the conditions of precipitation. However, the proportion of alumina to silica can be varied in either direction to produce for example, mixtures having the approximate formulas $2Al_2O_3.SiO_2.nH_2O$ or $Al_2O_3.2SiO_2.nH_2O$. The adsorbed water and part of the combined water are preferably removed in a preliminary drying period so that the precipitate contains about 15% by weight of combined water. At this point pelleting of the catalyst is most easily brought about. If the water content is reduced much below this point the forming of the catalyst either by compression methods or by grinding and sizing is difficult since in either case there is a tendency of the particles to disintegration resulting in the formation of particles too fine for successful use in a cracking zone.

The activity and selectivity of the prepared catalysts will vary with the relative proportions of hydrated alumina and hydrated silica which have combined during their joint precipitation and this variation in properties is utilizable when selecting catalysts for assisting particular cracking reactions. For example, one proportion may furnish catalysts better for use in reforming a certain gasoline boiling range material, another may be better for use in the cracking of a gas oil distillate and still another may be better adapted to cracking still heavier fractions.

The reactions for preparing the present type of catalyst are those which occur in aqueous solution between salts of aluminum and alkali metal silicates. The salts of aluminum which may be employed are in general those of any of the mineral acids such as sulfuric, hydrochloric, and nitric acids and the aluminum compounds employed may also include the aluminates in which the aluminum is present in the acid radical. The following equations are given as typical to indicate the types of reactions involved in the formation of the preferred cracking catalysts.

(1) $2AlCl_3 + Na_2SiO_3 + 3H_2O =$
$Al_2O_3.SiO_2 + 2NaCl + 4HCl + H_2O$ (2) $2NaAlO_2 + Na_2SiO_3 + 2H_2O + 4HCl =$
$Al_2O_3.SiO_2 + 4NaCl + 4H_2O$

The above equations are given in bare outline and in them no account is taken of the water of hy-

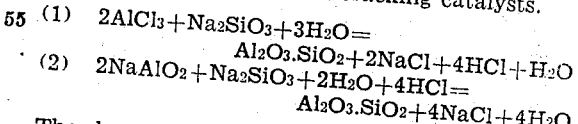

dration which may be present in the original precipitated silicate which may correspond to various hydrosilicic acids. Other soluble silicates than those of sodium may be used though those utilizable are in general principally confined to those of the alkali metals. To obtain the best product in any precipitation, the final acidity of the aqueous menstruum in which the precipitation is carried should correspond to a pH value of approximately 5 to 10. This can be accomplished by calculating the requisite amount of acid or alkali which may be added to a certain volume of water in which the precipitation is brought about by the simultaneous and gradual addition of more concentrated solutions of the aluminum compounds and silicates or which may be previously added to either solution in case precipitation is brought about by the mixing of two relatively dilute solutions. If the pH value is within the range mentioned when the mixing of the solutions is complete, there will be no unprecipitated silica or alumina, and if vigorous agitation is maintained during the precipitation there is evidently at least partial chemical combination to form of the hydrated catalysts. As a rule temperatures above normal atmospheric are not preferable since their use tends to produce catalysts of inferior value.

The primary hydrated precipitates are of a somewhat gelatinous character and are usually best washed from adhering soluble materials by the decantation method. After a final washing by this method, the precipitate is recovered as a filter cake by using any known type of suction or pressure filter and is then heated to a temperature of the order of 300° F. for a period of 36–48 hours after which it may be ground and sized to cover particles of a convenient average diameter or formed into any desired shapes by compression methods. It has been found that the drying at 300° F. produces material having a total water content of about 15% by weight which as already stated apparently corresponds to the best workability of the material. In service at cracking temperatures of the order of approximately 850–1000° F., a further dehydration occurs so that for example after a considerable period of heating at 900° F., the water content as determined by analysis is of the order of 2–3% which is firmly fixed and does not vary either as the result of long service or a large number of reactivations.

If desired, small amounts of salts of various metals may be added to the aqueous menstruum in which the original precipitation is carried out so that the catalyst ultimately produced contains small proportions of promoting substances. The use of these materials is optional, however, and whether they are used will depend upon the exact character of the reaction for which the catalyst is being prepared.

Catalysts prepared by the above general procedure evidently possess a large total contact surface corresponding evidently to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

According to the present process catalysts prepared by the general procedure described in the preceding paragraphs are utilized to the best advantage as filling material in tubes or chambers in the form of small pellets or granules. In the majority of cases wherein hydrocarbon fractions readily vaporizable at moderate temperatures without extensive decomposition are employed, the average particle size is within the range of 6–10 mesh, which may apply either to small pellets of uniform size and short cylindrical shape or to particles of irregular size and shape produced by the grinding and sizing of the partially dehydrated materials. While the simple method of preheating a given fraction of hydrocarbon oil vapors to a temperature suitable for their cracking in contact with the catalysts and then passing the vapors over a stationary mass of catalyst particles contained in a cylindrical chamber (preferably vertical) may be employed in some cases, it is usually preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions.

After the passage of the oil vapors over the catalyst, the products may be separated into material unsuitable for further cracking, intermediate insufficiently converted fractions amenable to further catalytic cracking, gasoline boiling range materials and fixed gases, the intermediate fractions being returned directly to admixture with the charging stock so that ultimately there is complete recycling of all fractions and maximum utilization of the charging stock for gasoline production.

The present process besides being characterized by the use of novel catalysts is further characterized by the use of moderate temperatures, relatively low pressures and high throughputs in comparison with strictly thermal cracking processes in use at the present time. When dealing with intermediate distillate fractions of the character of gas oil, it is seldom necessary to employ temperatures greatly in excess of 900° F. in the catalytic conversion zone. In the matter of pressure, it is seldom desirable to employ those materially above atmospheric except insofar as this is necessary to insure a proper flow through the vaporizing and cracking zones and its succeeding fractionating equipment. However, since the pressure increases the capacity of both cracking and fractionating units, moderately superatmospheric pressures may be employed when their use is dictated by the overall economy of the process. The times of catalytic contact are relatively short and of the order of 8 seconds.

The following examples are introduced to show the general character of the results obtained when utilizing the present types of catalysts in cracking reactions, including specific examples of preparation of catalysts. However, the scope of the invention is not to be limited by the exact data thus introduced in illustration.

EXAMPLE I 500 volumes of a solution of aluminum sulfate having a molal concentration of 0.75 $Al_2(SO_4)_3$ was heated to boiling and 187 volumes of a solution of sodium silicate of 2 molal $Na_2SiO_3$ concentration was gradually added during vigorous mechanical agitation. The precipitate was washed 4 times by decantation with approximately 500 volumes of hot water and was then filtered and the cake calcined at 300° F. for 36 hours after which it was ground and sized to produce particles of from 6–10 mesh.

The catalyst particles thus prepared were charged into a bank of vertical parallel tubes which could be heated exteriorly to maintain a temperature of 910° F. during the passage of a paraffinic gas oil fraction through the catalyst. The space velocity was maintained at 1 volume of oil per volume of catalyst per hour. For a 24-hour period the initial production of gasoline in one pass over the catalyst was 30% by volume of the liquid charged which dropped to about 20% at the end of the 24-hour period, the average production being 25% which had an octane number of 79. During this period there was produced 1⅔ gallons of gasoline boiling range material per pound of catalyst and 7.6% by weight of gas. Table 1 shows the distillation characteristics of the gasoline and Table 2 shows an analysis of the fixed gases over the 24-hour period.

TABLE I

Gasoline characteristics

| | |
|---|---|
| Gravity, °A. P. I | 62.2 |
| IBP-Engler, °F | 96 |
| 10% | 117 |
| 20 | 139 |
| 30 | 161 |
| 40 | 185 |
| 50 | 210 |
| 60 | 242 |
| 70 | 274 |
| 80 | 298 |
| 90 | 344 |
| 95 | 373 |
| E. P., °F | 400 |

TABLE II

Analysis of gases

| | |
|---|---|
| Methane | 11.2 |
| Hydrogen, $H_2$ | 25.1 |
| Ethylene, $C_2H_4$ | 4.1 |
| Ethane, $C_2H_6$ | 9.2 |
| Propylene, $C_3H_6$ | 19.2 |
| Propane, $C_3H_8$ | 7.1 |
| Iso-butylene, i—$C_4H_8$ | 8.2 |
| Normal-butylenes, n—$C_4H_8$ | 11.0 |

By fractionating and recycling of intermediate stocks having the approximate boiling range corresponding to that of the original charge, there was ultimately produced a 55% yield of gasoline with an octane number of 80 by the motor method. In addition the higher olefin content of the gases comprising propylene and butylenes was catalytically polymerized so that the final yield of 80 octane number gasoline was raised to 60%.

EXAMPLE II

A solution consisting of 85.3 parts by weight of sodium silicate having the formula $$Na_2SiO_3.9H_2O$$

dissolved in 400 parts by weight of water was slowly added to a solution consisting of 145 parts by weight of aluminum chloride hexahydrate having the formula $AlCl_3.6H_2O$ dissolved in 400 parts by weight of water. To the mixture 100 parts by weight of concentrated ammonium hydroxide solution having a specific gravity of 0.94 was then added and then 700 parts by weight of water after which the reaction products were allowed to stand at room temperature for 18 hours. The precipitate was in this case first filtered and then washed by decantation with 5 washes of 600 parts by weight of water each. The washed precipitate was finally filtered, dried at 300° F. for 36 hours and formed into small cylindrical pellets by the use of a pilling machine.

Using the same charging stock as in Example I and the same general conditions of operation, there was finally produced a yield of 56% by volume of 80 octane number gasoline without the addition of the polymerized olefins.

We claim as our invention:

1. A process for the conversion of hydrocarbons which comprises cracking hydrocarbons heavier than gasoline in the presence of an alumina-silica catalyst resulting from the co-precipitation of approximately molecular equivalents of hydrated aluminum and silicon oxides in an aqueous menstruum.

2. The process as defined in claim 1 further characterized in that said hydrated oxides are co-precipitated in an aqueous menstruum containing ammonium hydroxide.

3. A process for the conversion of hydrocarbons which comprises cracking hydrocarbons heavier than gasoline in the presence of an alumina-silica catalyst resulting from the co-precipitation of hydrated aluminum and silicon oxides in an aqueous menstruum containing ammonium hydroxide.

JACOB ELSTON AHLBERG.
CHARLES L. THOMAS.